Oct. 15, 1968   R. R. WISSINGER ET AL   3,405,555

METHOD AND APPARATUS FOR TESTING PAPER

Filed Oct. 14, 1965

INVENTORS
ROBERT R. WISSINGER
GERRY H. EHRHARDT
BY

ATTORNEY

United States Patent Office 3,405,555
Patented Oct. 15, 1968

3,405,555
METHOD AND APPARATUS FOR TESTING PAPER
Robert R. Wissinger, Des Moines, and Gerry H. Ehrhardt, West Des Moines, Iowa, assignors to Pacific Industries, Inc., San Francisco, Calif., a corporation of California
Filed Oct. 14, 1965, Ser. No. 495,953
6 Claims. (Cl. 73—159)

ABSTRACT OF THE DISCLOSURE

Multi-lamina test package and method of testing paper stock for fiber disposition, continuity and coatability by selectively directed induced transfer of thermo-reactive coating material to and through an interposed test specimen onto an underlying test pattern sheet.

---

This invention relates to the testing of paper stock for specific characteristics and particularly to a novel test method and multi-lamina test packet conveniently utilizable in the practice thereof.

Paper manufacturing and converting operations thereon, such as coating and printing, are continually concerned with the size and number of pinholes that are present in the paper stock, the nature of the fiber disposition therein and with its coatability. Despite numerous suggested test procedures to provide reliable cooperative criteria, no standard pinhole test exists; fiber disposition is still widely determined by subjective visually based judgment and coatability is ascertained either by a drawdown with an ink or by actual application of a sample of the coating in a commercial coating machine. Both of the latter methods are conveniently employed even though the disadvantages of the drawdown method, such as wide variation in the type and amount of ink applied and in duration of heat exposure, and the disadvantages attendant coating machine application of a test coating, such as initial cost, required size of sample, inherent time delays and wide variations in the types and speed of coating material application and the attendant lack of reproduceability, have long been recognized.

This invention may be briefly described as an improved method for testing paper stock which includes effecting a thermally induced transfer of a coating lamina to an adjacent test specimen and through any apertures therein to an underlying test pattern sheet and a multi-lamina test packet that includes the necessary components for the convenient practice of the said method, including a thermally actuatable transfer coating disposed on an impervious barrier lamina.

Among the advantages of the subject invention is the provision of a rapid, simple and inexpensive method for providing readily comparable indications of the number of and size of pinholes present in a paper stock, its fiber distribution and its coatability. Still other advantages include the provision of a multi-purpose test method that avoids most, if not all, of the disadvantages attendant conventional test procedures and which is capable of effecting appreciable reductions in the production of inferior paper stock.

The primary object of this invention is the provision of an improved thermo-reactive method for testing paper stock.

Another object of this invention is the provision of a simple and inexpensive multi-lamina test packet by which paper stock may be conveniently examined for number and size of pinholes, fiber distribution and coatability.

Still another object of this invention is the provision of a thermo-reactive method for the testing of paper stock for pinholes, fiber formation and its printability or coatability.

A further object of this invention is the provision of a standard thermo-reactive test element in the nature of an improved thermally actuatable transfer coating disposed on an impervious barrier lamina.

Other objects and advantages of the invention will be pointed out in the following specification and claims and will be apparent from the accompanying drawings which serve to illustrate certain principles of the invention as incorporated in a presently preferred embodiment thereof.

Referring to the drawings.

Figure 1:
FIG. 1 is a schematic exploded view, in section, of elements includable in a multi-lamina test packet incorporating the principles of this invention and with a test specimen disposed in operative relation therewith.

Referring to the drawings and particularly to FIG. 1, there is illustrated a multi-lamina assemblage of sheets utilizable in the practice of the herein described method. Such assemblage includes a protective backing sheet 10 of uniform character so as to assure a desired uniformity of heat distribution across the surface of the thermo-reactive test element as will be later described. Such backing sheets 10 are suitably constituted by a low bluk paper of uniform formation and paper having a weight of 9–12 lbs. per ream, size 17 x 22 per 500 sheets, has been found to be satisfactory for use therefor. Disposed in abutting relation therewith is a thermo-reactive test element or standard generally designated 12 and comprising a barrier lamina in the nature of an impervious carrier sheet 14 disposed in abutting facing relation with the surface of the backing sheet and having a thermo-responsive transfer coating 16 disposed on the other surface thereof. The barrier lamina is constituted so as to be impermeable to the oils and waxes found in the transfer coating and to the passage or migration of the transfer coating or its constituent elements therethrough and barrier sheets formed of greaseproof paper (such as TR greaseproof paper manufactured by the Rhinelander Paper Co. of Rhinelander, Wis.), glassine paper or plastic films are suitable for use.

Selectively introduceable in facing relation with the thermo-reactive transfer coating 16 is the test specimen sheet of paper 18 or other planar sheet material that is to be subjected to test. The multi-lamina assemblage is completed by a test pattern sheet 20 again suitably constituted of a low bulk paper of uniform formation and having a smooth specimen facing surface to facilitate intimate interfacial contact with the underside of the test specimen 18. Smooth surfaced paper having a weight of 9–12 lbs. per ream, size 17 x 22 per 500 sheets, has been found to be suitable.

The thermo-reactive transfer coating 16 is constituted so as to be normally adherent to the impervious carrier sheet 14 at low or normally encountered temperature but to be essentially completely separable therefrom and unidirectionally transferable to the adjacent facing surface of the test specimen 18 upon the raising of the temperature at the coating layer-carrier sheet interface to a predetermined value. Transfer coatings having the desired properties are formable by intermixture of a thermoplastic resin, one or more waxes, a release agent and a colorant, such as a pigment or a dye. The particular thermoplastic resin employed does not appear to be a particularly critical factor except that it is necessary to select a resin that will soften or become somewhat tacky at the transfer temperature but yet will be essentially devoid of these characteristics at temperatures below the transfer temperature. Suitable thermoplastic resins may include ethyl cellulose, polyethylene, polypropylene, polyamides, vinyls, acetates, acrylics, and copolymers thereof. Ethylene copolymers, such as ethylene vinyl acetate and ethylene acrylate, such as the Zetafin resins manufactured and sold by the Dow Chemical Company and the Elvax resins manufactured and sold by E. I. du Pont de Nemours & Co., have been found to be particularly suitable for inclusion in preferred transfer coatings.

The waxes employed in the formation of the transfer coating are attended by certain critical parameters since they effectively determine the critical transfer temperature and materially effect the completeness of the transfer. More specifically, the waxes used should be of such nature as to have only a very narrow temperature differential between its melting point temperature and its setting point temperature, i.e. the temperature at which resolidification thereof takes place. Waxes having these desired properties are produceable from a narrow range of hydrocarbons and highly refined microcrystalline and paraffin waxes, such as those sold by the Bareco Wax Co. under the name "Be Square Wax" and the Sun Oil Company's 5512 wax have been found to be suitable for use. Investigations to date have apparently indicated that the careful selection of the wax component appears to markedly decrease the resin criticality and thus increase the number of acceptable thermoplastic resins that can be employed.

The release agent constituent should be of such nature as to be compatible with the solidified wax and thermoplastic resin components at or below the critical transfer temperature, but be essentially incompatible therewith at or above such critical transfer temperature, at least at the coating layer and carrier sheet interface, so as to assist in effecting a complete and thorough release of the interfacial bond between the transfer coating 16 and the barrier lamina 14 at the elevated critical temperature. Butyl and dioctyl phthalates, tricresyl phosphate and castor oil have all been found to have the desired complete release effecting properties.

The colorant constituent included in the transfer coating layer 16 acts as a staining agent and can suitably be constituted by a conventional pigment or dye, such as carbon black, milori blue, nigrosine, methyl violet, or by other well-known coloring agents.

The proportions of the various constituents can vary over rather wide limits to provide for a flexibility in the test parameters of transfer temperature and exposure duration and thus accommodate a rather wide range of coating and coatability variations. For example, complete thermally induced release of the coating from the carrier sheet and unidirectional transfer thereof has been effected with coating formulations having resin content of up to 40%, wax content from as low as 20% to as high as 80% and release agent content of up to as high as 40%. By way of a specific illustrative example, generally good results have been obtained with a transfer coating layer 16 constituted as follows:

| | Percent |
|---|---|
| Ethylene-vinyl acetate copolymer | 10 |
| 180° microcrystalline wax | 50 |
| Butyl phthalate | 30 |
| Carbon black | 10 |

Such a preferred transfer coating layer is such as to be readily applicable to carrier sheets 14 such as greaseproof paper, glassine paper, and plastic films, by conventional coating techniques, such as by solvent coating, spray coating, or hot melt.

In the practice of the subject invention, a test specimen 18 such as a sheet or segment of paper is inserted intermediate the facing surfaces of the test pattern sheet 20 and the thermally separable transfer coating 16 in a multi-lamina assemblage as generally illustrated in FIG. 1. The interface of transfer coating 16 and its carrier sheet as included in the multi-lamina test packet as so constituted is then uniformly subjected to an elevated temperature, at or above the critical temperature, to effect a thermally induced essentially complete separation of the coating layer 16 from the impermeable barrier lamina 14 and the unidirectional transfer thereof onto the facing surface of the test specimen 18.

The particular value of the critical temperature and the duration of the exposure thereto will be determined by the nature of the constituents of the particular coating layer 16 employed and by its duplicative relationship as a test method of coating to the actual coating of concern. Infrared radiation has been found to be particularly suitable and we have found that convenience is served by use of a conventional "Thermofax" copying machine as manufactured and sold by Minnesota Mining & Manufacturing Corporation.

Such unidirectional transfer of the thermally separable coating 16 will not only serve to apply the same to the adjacent facing surface of the test specimen 18 but such will also penetrate and pass through all pinholes in the test specimen 18 and will be deposited onto the underlying abutting surface of the test pattern sheet 20 to there provide a visual record not only of the number but also of the size and location of all such holes.

In light of the foregoing it will now be apparent that after transfer of the coating 16 has been effected and the various lamina have been separated, the uniformity of the coating on the specimens will illustrate the receptivity of the sample paper for the coating or ink involved and the reverse or uncoated side of the test specimen 18 will illustrate the fiber formation and the coatability of the tested stock. As also pointed out above, the surface of the test pattern sheet 20 that was disposed in abutting facing relationship with the underside of test specimen sheet 18 will clearly show both the size and number of pinholes present in the specimen sheet.

As will now be equally apparent the subject test method is not only rapid, simple, inexpensive and convenient but is also of such nature as to be reproduceable and to permit both qualitative and quantitative comparison of the results obtained.

Figure 2:
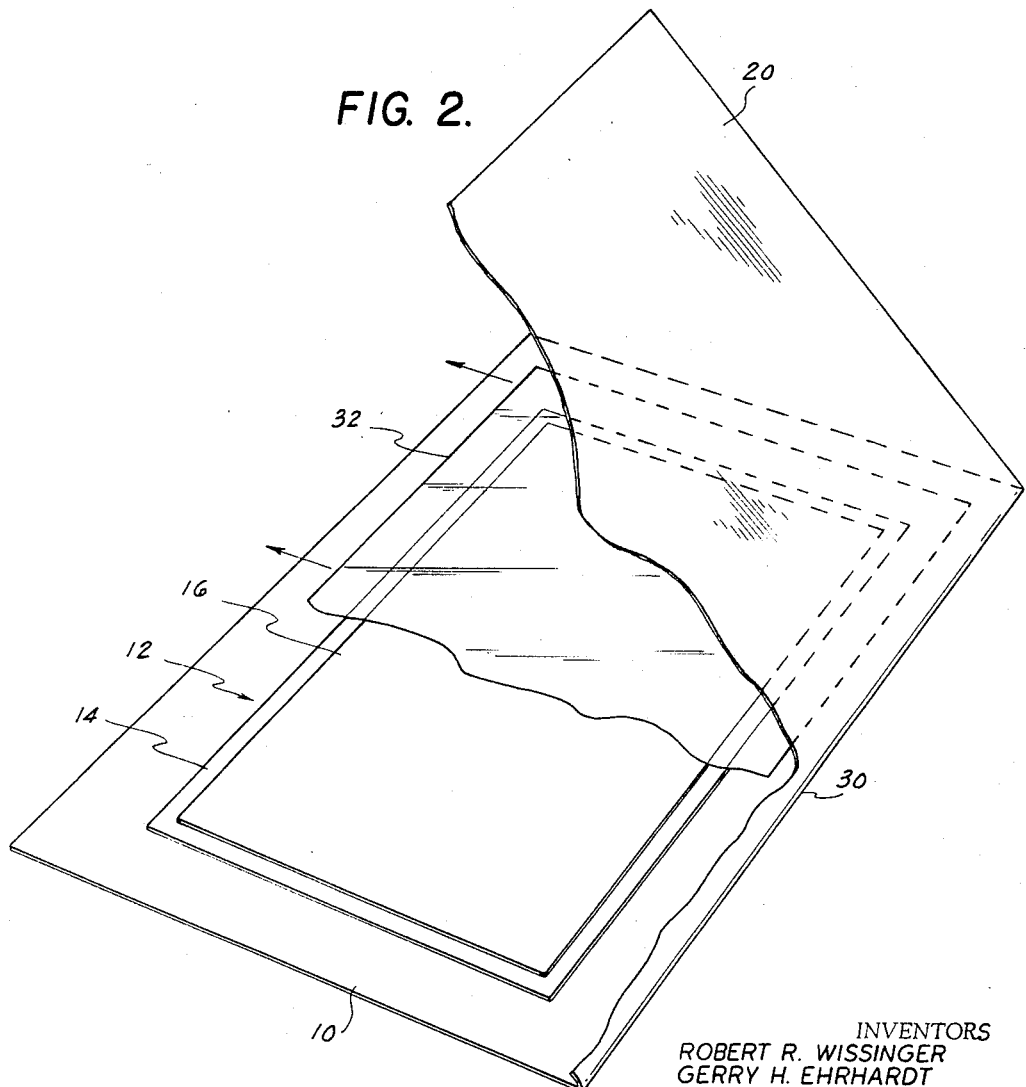
FIG. 2 is a schematic oblique view of an exemplary configuration for the multi-lamina test packet conveniently employable in the practice of the herein disclosed test method.

FIG. 2 illustrates a presently preferred construction for a multi-lamina test packet that is conveniently utilizable in the practice of the herein disclosed method. As there illustrated, the backing sheet 10 and test pattern sheet 20 are formed from a common lamina and are disposed in equisized facing relationship by a foldline along one marginal edge 30 thereof. Preferably, the fold line 30 is scored, partially perforated, or otherwise weakened so as to facilitate easy separation of the backing and test pattern sheets subsequent to the thermally induced transfer of the coating layer and to facilitate examination of the test pattern sheet. Disposed in overlying secured relation on the surface of the backing sheet 10 and preferably of appreciably reduced size with respect thereto, is the impermeable barrier sheet or lamina 14 having the thermoreactive transfer coating 16 disposed therein. Disposed intermediate the transfer coating 16 and the adjacent facing surface of the test pattern sheet 20 is a removable protective sheet 32, such as an inexpensive tissue sized to overlay the coating 16. As will now be apparent to those skilled in this art, the described packet is conveniently adaptable for use in the practice of the described method and requires nothing more than the mere replacement of the protective tissue sheet 32 by a test specimen 18 to form a composite multi-lamina assemblage as illustrated in FIG. 1 and described above that is ready for insertion into a Thermofax reproducer to effect the desired thermally induced transfer of the coating layer 16.

Having thus described our invention, we claim:

1. A multi-lamina test packet for the testing of paper comprising a back up sheet, a test pattern sheet disposed in facing relation with said back up sheet and joined thereto along one marginal edge thereof, an impermeable barrier lamina disposed on the face of said back up sheet oriented in facing relation with the surface of said test pattern sheet, and a thermally releasable colorant carrying transfer coating disposed on said barrier lamina and selectively and unidirectionally transferable therefrom to an adjacently disposed interleaved test specimen in response to elevation thereof to a predetermined temperature.

2. The packet as set forth in claim 1 including a removable protective sheet interposed intermediate said test pattern sheet and said transfer coating.

3. The packet as set forth in claim 1 wherein said back up sheet is separably joined to said test pattern sheet.

4. A multi-lamina test packet for paper testing comprising a back up sheet, an impermeable barrier lamina disposed in overlying abutting relation with a surface of said back up sheet, a thermally releasable pigment carrying transfer coating disposed on the surface of said barrier lamina positioned remote from said back up sheet and selectively separable therefrom in response to elevation to a predetermined temperature, a test specimen sheet disposed in abutting facing relation with said transfer coating for reception thereof upon separation of said transfer coating from said barrier lamina, and a test pattern sheet disposed in abutting facing relation with the surface of said test specimen sheet positioned remote from said transfer coating for reception of portions of said transfer coating that penetratively traverse said test specimen sheet.

5. A paper test method comprising the steps of interposing a paper specimen to be tested intermediate a test pattern sheet and a thermally transferable pigment carrying coating on an impermeable backing lamina, and exposing said assemblage to a predetermined elevated temperature to selectively effect unidirectional transfer of said transfer coating to said test specimen and through any apertures therein to said pattern sheet.

6. In the testing of paper for fiber distribution and apertures therein the step of thermally transferring a pigment carrying coating from an impermeable backing lamina unidirectionally to an adjacent paper specimen to be tested and through any apertures therein and on to an underlying test pattern sheet to there produce, after separation of said test pattern sheet from said specimen, a visually observable pattern of the fiber distribution and apertures present in said specimen being tested.

References Cited

UNITED STATES PATENTS

| | | | |
|---|---|---|---|
| 1,941,697 | 1/1934 | Lawrence | 117—3.4 |
| 1,977,680 | 10/1934 | Lawrence | 117—3.4 |
| 2,067,435 | 1/1937 | Chatfield. | |
| 2,731,912 | 1/1956 | Welsh | 101—129 |
| 3,060,023 | 10/1962 | Burg et al. | 117—3.4 XR |

S. CLEMENT SWISHER, *Acting Primary Examiner.*

JEFFREY NOLTON, *Assistant Examiner.*